US006510929B1

(12) United States Patent
Gordaninejad et al.

(10) Patent No.: US 6,510,929 B1
(45) Date of Patent: Jan. 28, 2003

(54) CONTROLLABLE MAGNETO-RHEOLOGICAL FLUID DAMPER

(75) Inventors: Faramarz Gordaninejad, Reno, NV (US); Everet O. Ericksen, Newport, MI (US)

(73) Assignee: The Board of Regents of the University and Community College System of Nevada, Reno, NV (US)

(*) Notice: Subject to any disclaimer, the term of this patent is extended or adjusted under 35 U.S.C. 154(b) by 0 days.

(21) Appl. No.: 09/722,613

(22) Filed: Nov. 28, 2000

Related U.S. Application Data

(60) Provisional application No. 60/167,933, filed on Nov. 29, 1999.

(51) Int. Cl.[7] ............................................. F16F 9/53
(52) U.S. Cl. ................ 188/267.2; 188/320; 267/140.14
(58) Field of Search ......................... 188/267.2, 267.1, 188/267, 314, 316, 320; 267/64.15, 140.14, 217

(56) References Cited

U.S. PATENT DOCUMENTS

| 3,362,508 | A | * | 1/1968 | Mayer ........................... 188/283 |
| 3,672,474 | A | * | 6/1972 | Mayer et al. .................. 188/282 |
| 5,158,109 | A | * | 10/1992 | Hare, Sr. ....................... 137/514.3 |
| 5,277,281 | A | | 1/1994 | Carlson et al. ................. 188/267 |
| 5,277,283 | A | * | 1/1994 | Yamaoka et al. ............... 188/319 |
| 5,284,330 | A | | 2/1994 | Carlson et al. .............. 267/140.14 |
| 5,316,114 | A | * | 5/1994 | Furuya et al. ................. 188/299 |
| 5,398,917 | A | * | 3/1995 | Carlson et al. ............. 267/140.14 |
| 6,019,201 | A | | 2/2000 | Gordaninejad et al. ...... 188/267.1 |
| 6,131,709 | A | * | 10/2000 | Jolly et al. ................... 188/267.2 |

FOREIGN PATENT DOCUMENTS

WO    WO 98/04846    * 2/1998

* cited by examiner

*Primary Examiner*—Christopher P. Schwartz
*Assistant Examiner*—Xuan Lan Nguyen
(74) *Attorney, Agent, or Firm*—Morgan, Lewis & Bockius LLP

(57) ABSTRACT

A damper includes a housing, a piston, and a magneto-rheological (MR) fluid. The piston is movably disposed within the housing such that the piston divides an interior of the housing into first and second cavities and a passage defined in the piston couples the first and second cavities. The passage includes at least a disk shape space within the piston defined between by two substantially parallel surfaces. The MR fluid damps motion of the piston by a flow of MR fluid through the passage, and a magnet produces a magnetic field within at least the disk shape space of the passage.

19 Claims, 4 Drawing Sheets

CONTROLLABLE MAGNETO-RHEOLOGICAL FLUID DAMPER

This application claims priority to a provisional application, Ser. No. 60/167,933, filed Nov. 29, 1999.

BACKGROUND OF THE INVENTION

1. Field of the Invention

The present invention relates to a damper, and more particularly, to a controllable magneto-rheological fluid damper.

2. Discussion of the Related Art

During the past decade, there has been increasing interest in the development of controllable shock absorbers that utilize electro-rheological fluid (ERF) and magneto-rheological fluid (MRF). The possibility of using ERF or MRF based damping devices in various applications has made these controllable devices attractive to the vibration control field. Controllable shock absorbers can potentially be used in a variety of mechanical systems such as bicycles, motorcycles, automobiles, trucks, ships, trains, airplanes, bridges, buildings and/or other structures, sports equipment and any other systems using vibration control.

An MRF consists of micron-sized, magnetically polarized particles suspended in a carrier fluid such as silicon or mineral oils. MRFs are capable of responding to a magnetic field in a few milliseconds. The material properties of an MRF can be changed rapidly by increasing or decreasing the intensity of the applied magnetic field. This is realized as a controllable increase in the apparent viscosity of the fluid by varying the current supplied to the damper's built-in electromagnet. A higher fluid viscosity yields a higher damping force. This is the mechanism behind the controllability of MRF dampers.

In a conventional MRF damper disclosed by FIG. 9(c) of U.S. Pat. No. 5,277,281, the system uses an entrance fluid port and a exit fluid port connected by a channel. The fluid flows through a lateral channel portion in the path between the entrance and exit ports. Here, the lateral channel portion extends through a fixed arc. In addition, the lateral channel is required to flow around a plug, associated with the shaft, that extends into the center of the piston.

As a result of this design, the above-referenced damper suffers from a number of limitations. For example, the damper cannot accommodate multiple entrance and exit ports. The use of a single entrance and a single exit port diminishes the flexibility of the design with respect to the damping force that can be generated. This is of particular importance when small initial or zero-field (no current applied) damping forces are desired. In addition, the MR fluid must flow around the plug in the center of the piston, thereby reducing the surface area to which the MR fluid chains adhere to the wall. This reduction in surface area reduces the damping force that can be generated by the MR fluid upon application of a magnetic field.

SUMMARY OF THE INVENTION

Accordingly, the present invention is directed to a damper that substantially obviates one or more of the problems due to limitations and disadvantages of the related art.

An object of the present invention is to provide a damper that has improved damping characteristics.

Another object of the present invention is to provide of a damper that can be efficiently manufactured at a low cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a damper comprises a housing; a piston movably disposed within the housing, the piston dividing an interior of the housing into first and second cavities and having a passage defined in the piston to couple the first and second cavities, wherein the passage includes at least a disk shape space within the piston defined between by two substantially parallel surfaces; a magneto-rheological (MR) fluid contained within at least the first cavity, motion of the piston being damped by a flow of MR fluid through the passage; a magnet disposed to produce a magnetic field within at least the disk shape space of the passage.

In another aspect, a damper comprises a housing; a piston movably disposed within the housing, the piston dividing an interior of the housing into first and second cavities and having a passage defined in the piston to couple the first and second cavities, wherein the passage includes at least a space within the piston coupled with the first cavity through a plurality of inlet flow ports and coupled with the second cavity through at least one outlet flow port; a magneto-rheological (MR) fluid contained within at least the first cavity, motion of the piston being damped by a flow of MR fluid through the passage; a magnet disposed to produce a magnetic field within at a portion of the passage.

In another aspect, a damper comprises a housing; a piston movably disposed within the housing, the piston dividing an interior of the housing into first and second cavities and having a passage defined in the piston to couple the first and second cavities, wherein the passage includes a plurality of inlet ports to couple the passage with the first cavity and a plurality of outlet ports to couple the passage with the second cavity, the number of inlet flow ports being different than the number of outlet flow ports; a magneto-rheological (MR) fluid contained within at least the first cavity, motion of the piston being damped by a flow of MR fluid through the passage; a magnet disposed to produce a magnetic field within at least a portion of the passage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
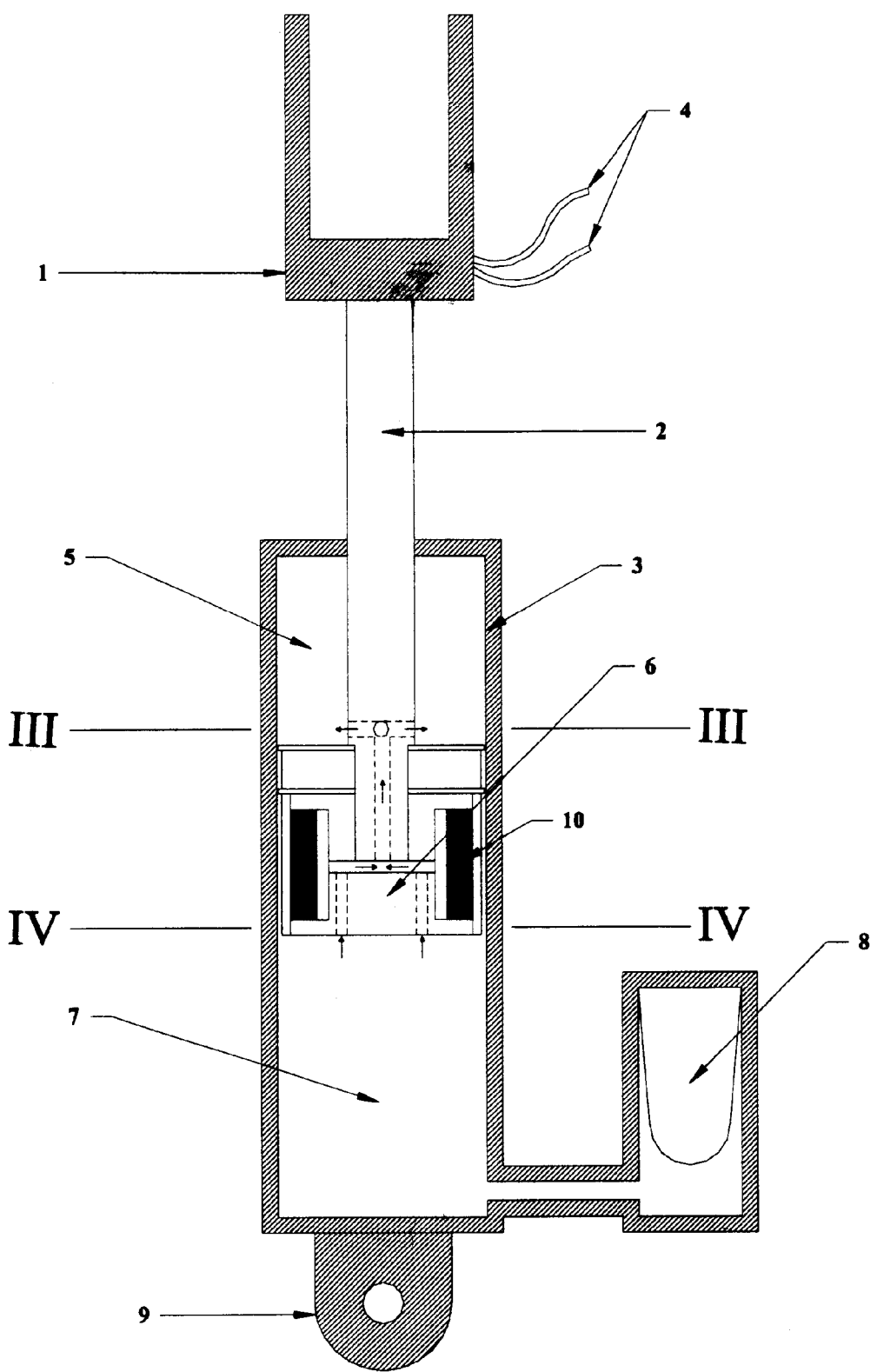
FIG. 1 is a cross-section view of an MRF vibration damper according to an embodiment according to the present invention.

The present application is related to and claims the benefit of U.S. Provisional Patent Application No. 60/167,933 entitled "Controllable Magneto-Rheological Fluid Shock Absorbers" filed Nov. 29, 1999 by the present inventors, which is hereby incorporated by reference.

Reference will now be made in detail to the preferred embodiments of the present invention, examples of which are illustrated in the accompanying drawings.

The present invention relates to an MRF damper. As will be generally described and will be described in detail below, the damper preferably comprises one or more housings each containing a piston. The piston is generally cylindrical in shape and is movable within an interior of the housing to define first and second interior portions. The housing contains an appropriate amount of MRF. The material properties of the MRF are varied using magnetic fields (generally cylindrical or torroidal in shape) that surround and incorporate the regions of the housing and piston. A variable magnetic field is generated by winding a coil of magnetic wire around the housing. Alternatively, the coil can be wound around a portion of the housing having the piston and the corresponding MRF passages. Seals are provided at the caps of the housing by O-rings or other suitable means to prevent leakage and/or reduce contamination. A spring or spring-like materials can be employed in series or parallel to construct a spring-dashpot damping device.

The present invention takes advantage of the fact that the ferrous particles in MRF form chain-like strings along the flux lines. The chain-like formation of ferrous particles (MRF build-up) through the passage provides an effective increase in apparent viscosity of the fluid within the MRF flow passages, thereby increasing the pressure drop across the two ends of the piston. The increase in pressure drop across the two ends of the piston increases the resisting (damping) force.

According to the present invention, a portion of the MR fluid flow is occurs in a disk shaped void (space) defined between two parallel surfaces incorporated in the MRF damper. With this type of arrangement, the contact area for the chain-like formation of ferrous particles to adhere to the wall is significantly increased. That is, the MR fluid flow is distributed about a larger area, thereby enabling the MRF chains be formed within the larger area having a reduced MRF flow density. Furthermore, this design incorporates multiple inlet and outlet flow ports allowing for separate compression and rebound flow paths. This allows the damper to produce different compression and rebound force characteristics if desired. Furthermore, multiple inlet and outlet flow paths provide greater flexibility in the design of the dampers. The number of inlet and outlet flow paths can be varied in order to produce a desired off-state (zero applied magnetic field) damping force. The number of inlet ports need not be the same as the number of outlet ports.

Specific embodiments of the damper of the present invention will now be described in detail with reference to FIGS. 1–5.

FIG. 1 illustrates the MRF vibration damper which includes a housing 3 and a piston 6 that divides the interior of the cylinder 3 into two portions: the compression chamber 7 and the rebound chamber 5. Incorporated into the piston 6 in the embodiment of FIG. 1 is a wound magnetic coil 10.

The coil 10 has two external electrical wire leads 4 that are connected to an external electrical power source. There are two external mounting pieces 1 and 9 to secure the movable end (comprising mount 1, piston rod 2, and piston 6) of the damper and the non-movable end 9 to the vehicle. The accumulator passage 8 accommodates the added volume due to the rod 2 when the piston 6 is compressed.

Figure 2:
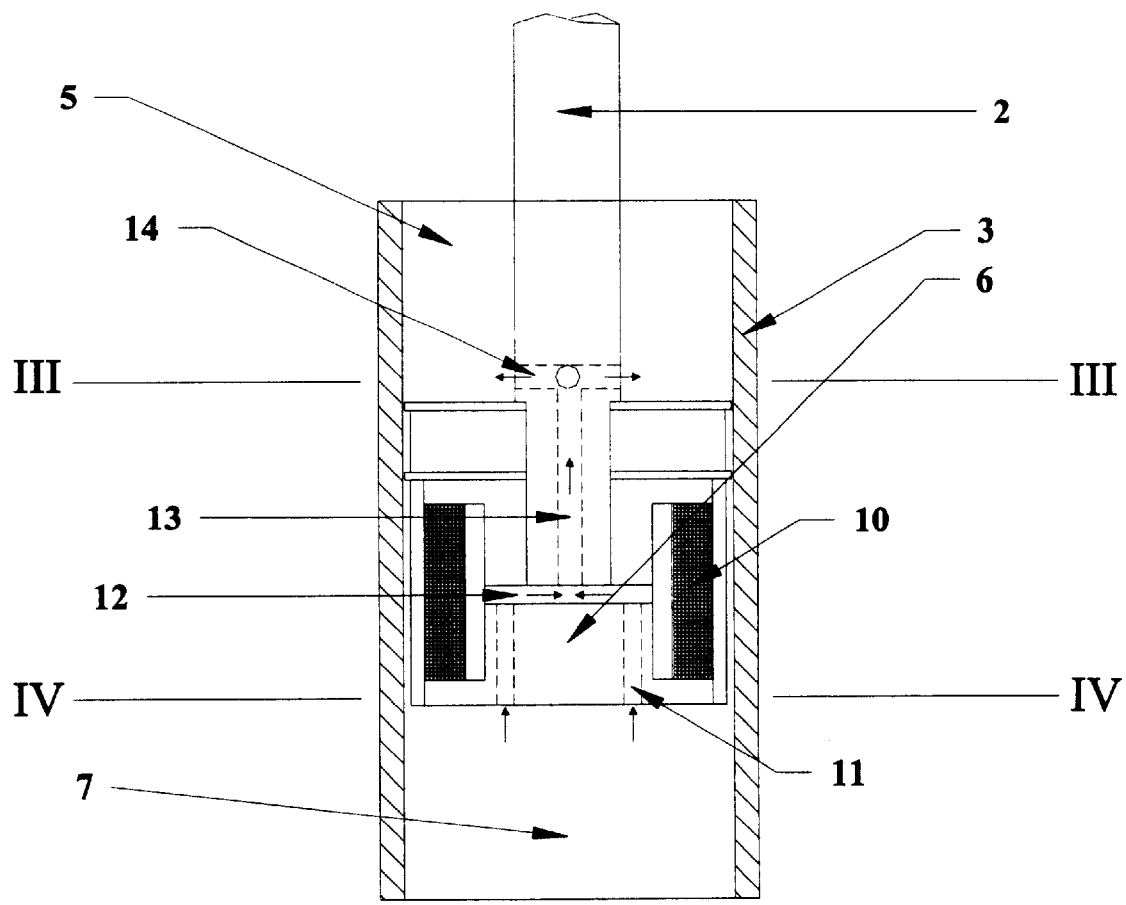
FIG. 2 is an enlarged, cross-sectional view of the piston of the damper of FIG. 1.

FIG. 2 shows a enlarged cross-sectional view of the MRF damper of FIG. 1 to illustrate the internal elements of the damper. The piston 6 may have one or more inlet ports 11. The fluid enters the parallel plate flow region 12 and converges to the center of the piston 6. The flow region 12 is the primary location of the "MRF build-up". The MR fluid flows through the center of the rod 13 and exits through one or more exit ports 14.

Figure 3:
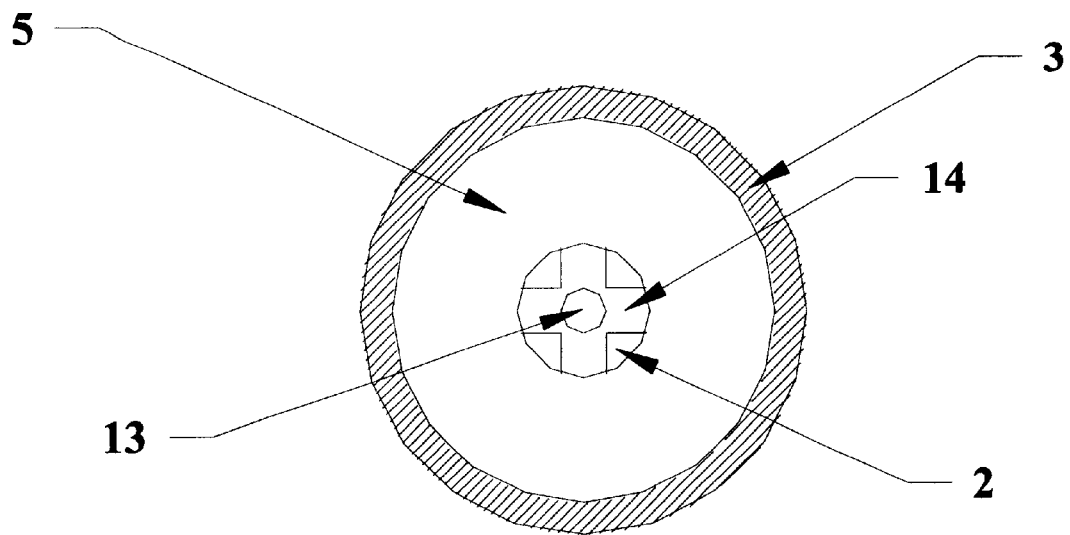
FIG. 3 is a cross-sectional view of the damper across line III—III of FIG. 1.

FIG. 3 shows a top, cross-sectional view of the damper across line III—III of FIGS. 1 and 2. As shown, there are four exit flow ports 14 and one flow port 13 through the center of the rod 2. Other numbers of exit flow ports 14 may be used so long as there are one or more.

Figure 4:
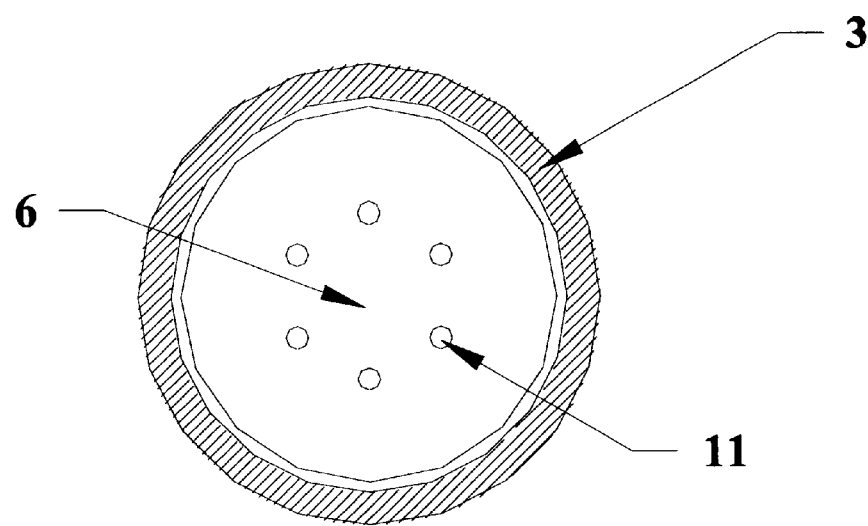
FIG. 4 is a cross-sectional view of the damper across line IV—IV of FIG. 1.

FIG. 4 shows a top, cross-sectional view of the damper across line IV—IV in FIGS. 1 and 2. As shown, there are six inlet flow ports 11 in the piston 6. However, other numbers of inlet flow ports 11 can be used so long as there are one or more. Although FIG. 4 shows the six inlet flow ports regularly arranged to define a hexagonal pattern, the inlet flow ports may be arranged in any patter including random patterns.

Figure 5:
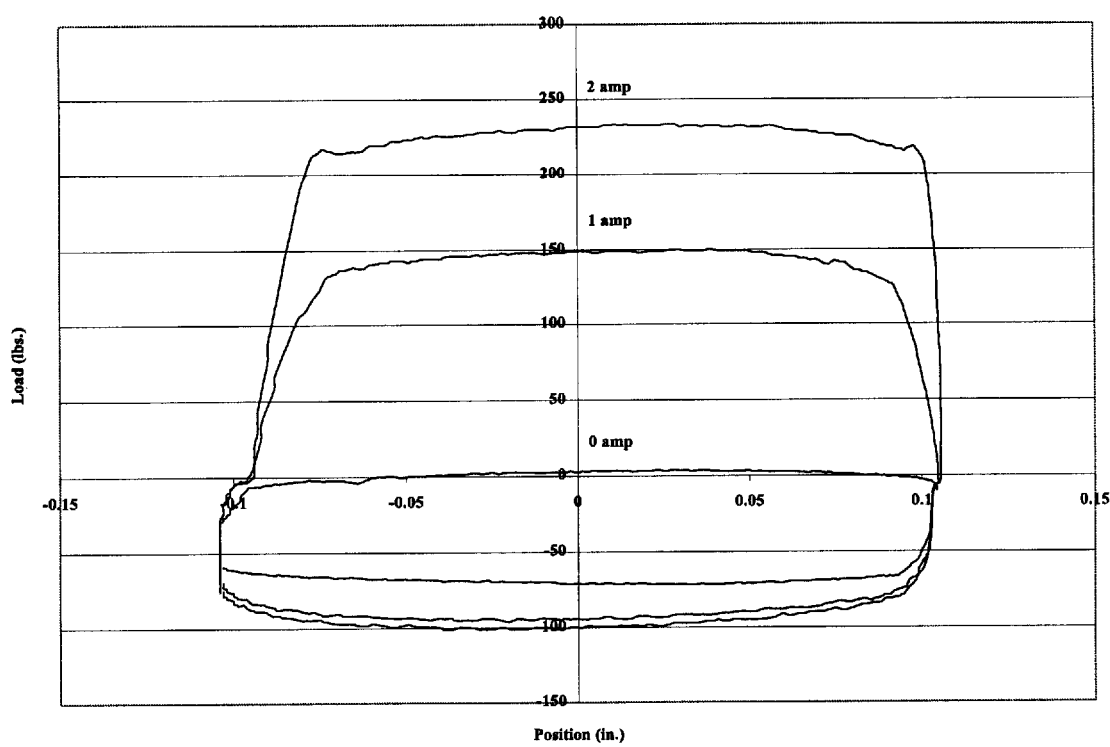
FIG. 5 is a graph of the experimental force-displacement results a damper according to the embodiment of the damper of FIG. 1 with test conditions at a frequency of 1 Hz and a peak-to-peak displacement of 0.2 in (0.508 cm).

A damper in accordance with FIGS. 1—4 was built and tested in the laboratory. FIG. 5 shows the force vs. displacement performance test of the proposed MRF shock absorber design at three different input currents: 0 A, 1 A, and 2 A. The plot shows the response of the damper to a displacement input of 0.2 inches (0.508 cm) (peak-to-peak) and a frequency of 1.0 Hz. As can be seen in FIG. 5, after activating the MRF damper with 2 amps of input current, the maximum force produced by the damper increases from 5 lbf (22.24 N) to 235 lbf (1045 N). This is an increase of 230 lbs. (1022.76 N) from 0.0 amp to 2.0 amp current input. In addition, a damper was tested in off-road applications on a motorcycle and found to provide superior performance.

As described above, the damper according to the present invention provides a MR fluid flow channel having a portion defined as a disk shaped void between parallel surfaces, thereby resulting in parallel plate flow. In a preferred embodiment, the MR fluid enters the piston through multiple inlets at the outer most radial edge of the piston. The fluid flows through a disk shaped void defined between parallel surfaces towards the axial center of the piston. Then, in the preferred embodiment, the fluid flows through a passage through the center of the piston or rod and subsequently exits. Because the rod does not extend to the center of the piston (i.e., where the disk shaped void is defined), the contact area on which the MR fluid forms chains to the surface of the wall is increased in the damper. Thus, much higher damping forces result from the magnetic field, thereby leading to higher damping forces of the damper. Also, as mentioned above, a single or multiple inlet ports can be utilized allowing for greater flexibility in the design. With the multiple inlet and outlet port design, it is possible to design separate compression and rebound flow paths resulting in different compression and rebound force characteristics.

As described herein, the damper of the present invention provides variably controlled flow of MR fluid in passages therein. Accordingly, the damper has improved performance characteristics. For example, the MR fluid flow path includes a disk shaped void defined between parallel surfaces, thereby causing a parallel plate flow. The parallel plate flow arrangement increases the contact area on which the MR fluid forms chains from the surface of the wall. The result is much higher damping force induced by the magnetic field. In addition, the design permits multiple inlet and outlet flow ports, thereby allowing for separate compression and rebound flow paths. Thus, the damper can achieve different compression and rebound force characteristics if desired. Also, multiple inlets and outlets give greater flexibility in the design of the damping forces by varying the number inlet and outlet flow ports.

In accordance with the embodiments described above, a number of variations can be realized in accordance with the specific application. For example, the housings of the dampers may comprise one or more of cavity units for containing MR fluid. In addition, The cavity units may be formed of either non-ferrous or ferrous materials or a combination of both types of materials. The dampers devices may also comprise one or more piston units that move within a cavity to define and displace MR fluid from multiple cavity portions. Similarly, the piston(s) may be manufactured from a combination of ferrous or non-ferrous materials. While the above described embodiments have one or more solenoids formed of windings of wires (electromagnets) to generate a magnetic field in and around the piston(s), other magnet types or techniques can be used to produce a magnetic field in accordance with the present invention. For example, the use of permanent magnets in place of, or in conjunction with, electromagnets may be used. Additionally, the use of an electromagnet to counteract the constant magnetic field of a permanent magnet(s) can be used to produce a reverse controlled mode. As another example, while axial piston motion has been described above, other motions, such as rotary motion or combinations of linear and rotary motions, can be applied in the damper of the present invention. Further, the design need not be limited to only two cavities, since the design may comprise a plurality of independent and/or dependent MR fluid cavities extending in any direction or dimension.

It will be apparent to those skilled in the art that various modifications and variations can be made in the damper of the present invention without departing from the spirit or scope of the invention. Thus, it is intended that the present invention cover the modifications and variations of this invention provided they come within the scope of the appended claims and their equivalents.

What is claimed is:

1. A damper, comprising:

a housing;

a piston movably disposed within the housing, the piston dividing an interior of the housing into first and second cavities and having a passage defined in the piston to couple the first and second cavities, wherein the passage includes at least a disk shaped space within the piston defined by an entire region between two substantially parallel surfaces within a radial distance from an axis of the piston, a plurality of inlet flow ports coupling the first cavity to radially outer portions of the disk shaped space each through a substantially straight path, and a plurality of outlet flow ports each coupling the second cavity with a central portion of the disk shaped space;

a magneto-rheological (MR) fluid contained within at least the first cavity and the disk shaped space such that the MR fluid completely fills the entire region between the two substantially parallel surfaces within the radial distance from the axis of the piston, motion of the piston being damped by a flow of MR fluid through the passage;

a magnet disposed to produce a magnetic field within at least the disk shape space of the passage.

2. The damper according to claim 1, wherein the plurality of inlet flow ports are disposed proximate the radial edge of the piston.

3. The damper according to claim 1, wherein the plurality of outlet flow ports includes a portion defined along an axis of the piston and a portion opening to the second cavity.

4. The damper according to claim 1, wherein the piston includes a shaft portion.

5. The damper according to claim 1, wherein the magnet is an electromagnet.

6. The damper according to claim 1, wherein the number of inlet ports and the number of outlet ports being different.

7. The damper according to claim 1, wherein the magnet is disposed on the piston within the housing.

8. A damper, comprising:

a housing;

a piston movably disposed within the housing, the piston dividing an interior of the housing into first and second cavities and having a passage defined in the piston to couple the first and second cavities, wherein the passage includes at least a space within the piston coupled with the first cavity through a plurality of substantially straight inlet flow ports and coupled with the second cavity through a plurality of outlet flow ports with the number of inlet flow ports being different than the number of outlet flow ports;

a magneto-rheological (MR) fluid contained within at least the first cavity, motion of the piston being damped by a flow of MR fluid through the passage;

a magnet disposed to produce a magnetic field within at least a portion of the passage.

9. The damper according to claim 8, wherein the plurality of inlet flow ports of the passage are disposed proximate the radial edge of the piston.

10. The damper according to claim 8, wherein the passage includes a portion defined along an axis of the piston to couple the space with the second cavity in conjunction with the at least one outlet flow port.

11. The damper according to claim 8, wherein the piston includes a shaft portion.

12. The damper according to claim 8, wherein the magnet is an electromagnet.

13. The damper according to claim 8, wherein the magnet produces a magnetic field within at least the space.

14. A damper, comprising:

a housing;

a piston movably disposed within the housing, the piston dividing an interior of the housing into first and second cavities and having a passage defined in the piston to couple the first and second cavities, wherein the passage includes a plurality of substantially straight inlet ports to couple the passage with the first cavity and a plurality of outlet ports to couple the passage with the second cavity, the number of inlet flow ports being different than the number of outlet flow ports;

a magneto-rheological (MR) fluid contained within at least the first cavity, motion of the piston being damped by a flow of MR fluid through the passage;

a magnet disposed to produce a magnetic field within at least a portion of the passage.

15. The damper according to claim 14, wherein the inlet flow ports are disposed proximate the radial edge of the piston.

16. The damper according to claim 15, wherein the inlet flow ports are disposed randomly.

17. The damper according to claim 14, wherein the inlet flow ports are disposed randomly.

18. The damper according to claim 14, wherein the outlet flow port are further coupled with a portion of the passage defined along an axis of the piston.

19. The damper according to claim 14, wherein the magnet is an electromagnet.

* * * * *